United States Patent Office 3,625,703
Patented Dec. 7, 1971

3,625,703
COFFEE ADDITIVE
John A. Ericson, 732 Market St.,
Youngstown, Ohio 44502
No Drawing. Filed July 6, 1970, Ser. No. 52,686
Int. Cl. A23f *1/04, 1/12*
U.S. Cl. 99—65    3 Claims

ABSTRACT OF THE DISCLOSURE

A coffee additive mixed with ground roast coffee beans prior to brewing coffee therefrom includes dried yeast, dehydrated mustard, watercress, parsely and alfalfa greens and acts to reduce the acid and oil content of the brewed coffee.

BACKGROUND OF THE INVENTION

(1) Field of the invention

This invention relates to additives for coffee that are present when the coffee is brewed.

(2) Description of the prior art

Prior art coffee additives have generally related to so-called extenders such as ground chicory or the like added to both extend the coffee used and to alter and improve the flavor of the coffee brewed therefrom. No prior art additives are known which act to reduce the acid and oil content of the brewed coffee.

This invention retains and improves the taste of the coffee brewed from the coffee containing additive particularly with respect to the taste of the brewed coffee after an elapsed period of time. Additionally, the reduction in acid and oil lowers the residual amounts thereof sufficiently to avoid digestive disturbances which occur in some individuals following the ingestion of coffee.

SUMMARY OF THE INVENTION

A coffee additive consisting of a powdered mixture of dry yeast, dehydrated mustard greens, dehydrated alfalfa greens, dehydrated watercress and dehydrated parsley is added to ground roast coffee beans and mixed therewith. Coffee is then brewed from the coffee and additive mixture. The resulting coffee solutions will be found to contain less acid and oil than coffee solutions resulting from coffee brewed without the additive.

DESCRIPTION OF THE PREFERRED EMBODIMENT

A coffee additive prepared in a batch having a total weight of 7½ ounces comprises 3 ounces of powdered dry yeast or 85.049 gram, 1½ ounces of powdered dehydrated mustard greens or 42.525 grams, 1½ ounces of powdered dehydrated watercress or 42.525 grams, ¾ ounce powdered dehydrated alfalfa greens or 21.262 grams and ¾ ounce powdered dehydrated parsley or 21.262 grams, the total weight in grams comprising 212.623.

It has been determined that by adding 7 grams of the additive mixture to 454 grams (1 lb.) of ground roast coffee beans and mixing the same thoroughly will result in a sufficient quantity of the additive for the indicated purpose.

A comparative analysis of coffee solutions brewed from coffee without the additive and from coffee with the additive demonstrates the following results: 454 grams (1 lb.) of ground roast coffee beans was divided into two equal portions. To one portion 227.1 grams was added 3.5 grams of the additive mixture which was then thoroughly blended with the ground coffee. Brews were then prepared using 60 grams of the coffee with the additive and 1 liter of distilled water with a perculating time of seven minutes. A control brew was prepared using 60 grams of the coffee without the additive and 1 liter of distilled water with a perculating time of seven minutes. The resulting coffee solutions were then analyzed for acid and oil content. Potentiometric titration with sodium hydroxide was used to determine the acid content and continuous extraction with ethyl ether for 48 hours was used to determine the oil content. The result:

|  | Coffee with additive | Plain coffee |
| --- | --- | --- |
| Acid, milliequivalents per milliliter | 0.00625 | 0.00644 |
| Oil, milligrams per milliliter | 1.26 | 1.49 |

It will thus be seen that the coffee brewed with the additive as disclosed herein had 0.00019 milequivalent per milliliter less acid than the coffee brewed from the plain coffee and that the coffee brewed with the additive had —.23 milligram per milliliter less oil than the coffee brewed from plain coffee.

It is believed that the reduction in acid and oil content in the brewed coffee solution is responsible for the ability of the brewed coffee solution to maintain a desirable taste characteristic over a period of several hours after brewing and that the smaller acid and oil content is more easily tolerated by the human digestive system.

It will occur to those skilled in the art that the quantities of the ingredients incorporated in the additive may be varied within the following ranges without affecting the qualities of the additives. The dry powdered yeast may be present in amounts from 65.00 grams to 105.00 grams. The powdered dehydrated mustard greens may be present in amounts between 35.00 grams and 50.00 grams. The powdered dehydrated watercress may be present in amounts between 35.00 grams and 50.00 grams. The powdered dehydrated alfalfa greens may be present in amounts between 14.00 grams and 29.00 grams, and the powdered dehydrated watercress may be persent in amounts between 14.00 grams and 29.00 grams.

It will also occur to those skilled in the art that the amount of the additive used with one pound, 454 grams of coffee may be varied between 5.0 grams and 10.0 grams, with an increased reduction in the acid and oil contents in relation to the larger quantity of the additive employed.

The herein before described additive when blended with ground roast coffee beans has been found to result in an improved coffee solution brewed therefrom in that the acid and oil content of the brewed coffee solution will be lowered sufficiently to enable the brewed solution to avoid a build up of adverse taste producing reactions over a period of time after brewing for example as great as eight hours and that the lowered acid and oil contents of the brewed coffee solution will be more palatable and less likely to cause upsets in the digestive tract when ingested by the average person.

Although but one embodiment of the present invention has been described it will be apparent to those skilled in the art that various changes and modifications may be made therein without departing from the spirit of the invention and having thus described my invention, what I claim is:

1. An additive for ground roasted coffee beans from which a coffee solution may be brewed, said additive including approximately 85 grams of dried powdered yeast, approximately 42 grams of dehydrated mustard greens, approximately 42 grams of dehydrated watercress, approximately 21 grams of dehydrated alfalfa greens and approximately 21 grams of dehydrated parsley, approximately 7 grams of additive used for 454 grams of said beans.

2. An additive for ground roast coffee beans from which a coffee solution may be brewed, said additive including between about 65 grams to about 105 grams of dried yeast, between about 35 grams to about 50 grams of dehydrated mustard greens, between about 35 grams to about 50 grams of dehydrated watercress, between about 14 grams to about 29 grams of dehydrated alfalfa greens and between about 14 grams to about 29 grams of dehydrated parsley, approximately 7 grams of additive used per 454 grams of said beans.

3. A coffee preparation from which an aqueous coffee solution may be brewed consisting of about 227 grams of ground roast coffee beans and about 3.50 grams of an additive including dried yeast, dehydrated mustard greens, dehydrated alfalfa greans, dehydrated watercress and dehydrated parsley; in proportions of approximately 4:2:2:1:1 respectively.

References Cited
UNITED STATES PATENTS

| | | | |
|---|---|---|---|
| 2,036,345 | 4/1936 | Merkel | 99—71 |
| 2,149,876 | 3/1939 | Wendt et al. | 99—71 |

FRANK W. LUTTER, Primary Examiner

W. L. MENTLIK, Assistant Examiner

U.S. Cl. X.R.

99—71